US011994583B2

(12) United States Patent
Sugae et al.

(10) Patent No.: US 11,994,583 B2
(45) Date of Patent: May 28, 2024

(54) OBJECT DETECTION DEVICE (71) Applicant: AISIN CORPORATION, Aichi (JP)

(72) Inventors: Ippei Sugae, Kariya (JP); Koichi Sassa, Kariya (JP)

(73) Assignee: AISIN CORPORATION, Aichi (JP)

(*) Notice: Subject to any disclaimer, the term of this patent is extended or adjusted under 35 U.S.C. 154(b) by 33 days.

(21) Appl. No.: 17/569,202

(22) Filed: Jan. 5, 2022

(65) Prior Publication Data
US 2022/0214450 A1 Jul. 7, 2022

(30) Foreign Application Priority Data

Jan. 7, 2021 (JP) ................. 2021-001721

(51) Int. Cl.
G01S 15/10 (2006.01)
G01K 1/14 (2021.01)
G01S 15/931 (2020.01)

(52) U.S. Cl.
CPC ............... *G01S 15/10* (2013.01); *G01K 1/14* (2013.01); *G01S 15/931* (2013.01)

(58) Field of Classification Search
None
See application file for complete search history.

(56) References Cited

U.S. PATENT DOCUMENTS 6,208,248 B1 * 3/2001 Ross ................... G01S 13/0209
340/552
6,938,488 B2 * 9/2005 Diaz .................. G01N 29/0609
73/52

(Continued)

FOREIGN PATENT DOCUMENTS

DE 102019108420 A1 * 10/2019 ........... B60R 21/013
JP S63173200 A * 7/1988

(Continued)

OTHER PUBLICATIONS

Kabakchiev, Christo, Lyubka Doukovska, and Ivan Garvanov. "Cell averaging constant false alarm rate detector with Hough transform in randomly arriving impulse interference." Cybernetics and Information Technologies 6.1 (2006): 83-89. (Year: 2006).*

(Continued)

*Primary Examiner* — Yuqing Xiao
*Assistant Examiner* — Jonathan D Armstrong
(74) *Attorney, Agent, or Firm* — Sughrue Mion, PLLC (57) ABSTRACT An object detection device includes: a transmitter transmitting a transmission wave; a receiver receiving a reception wave reflected by an object; a CFAR processor acquiring a CFAR signal at a detection timing by CFAR processing based on a value of a first processing target signal and an average value of values of second processing target signals; a detection processor detecting information related to the object based on a comparison between the CFAR signal and a threshold; and a threshold processor setting, when the detection timing belongs to a predetermined first section, the threshold as a first threshold calculated in consideration of a detection result of a temperature sensor, and setting, when the detection timing belongs to a predetermined second section, the threshold as a second threshold calculated without considering the detection result of the temperature sensor.

5 Claims, 6 Drawing Sheets (56) References Cited

U.S. PATENT DOCUMENTS

| | | | |
|---|---|---|---|
| 10,663,583 B2 * | 5/2020 | Lee ................ | G01S 15/931 |
| 2004/0035208 A1 * | 2/2004 | Diaz ................ | G01N 29/326 |
| | | | 702/56 |
| 2004/0095269 A1 * | 5/2004 | Uehara ............. | G01S 7/023 |
| | | | 342/159 |
| 2014/0148992 A1 * | 5/2014 | Shaffer ............ | G01S 15/931 |
| | | | 701/33.7 |
| 2017/0301220 A1 * | 10/2017 | Jarrell ............. | G05D 1/0022 |
| 2018/0164439 A1 * | 6/2018 | Droz ............... | G01S 17/89 |
| 2019/0302258 A1 * | 10/2019 | Lee ................ | G01S 7/526 |
| 2021/0165097 A1 * | 6/2021 | Droz ............... | G01S 17/42 |
| 2022/0011434 A1 * | 1/2022 | Rainko ............. | G01S 7/483 |
| 2022/0067848 A1 * | 3/2022 | Lu .................. | G06F 16/909 |
| 2022/0155450 A1 * | 5/2022 | Gassend ........... | G01S 7/484 |

FOREIGN PATENT DOCUMENTS

| | | | | |
|---|---|---|---|---|
| JP | 2001195700 A | * | 7/2001 | |
| JP | 2004210125 A | * | 7/2004 | ............. B60Q 1/085 |
| JP | 2004210128 A | * | 7/2004 | ............. B60Q 1/085 |
| JP | 2006-292597 A | | 10/2006 | |
| JP | 2008122126 A | * | 5/2008 | |
| WO | WO-2020181019 A1 | * | 9/2020 | ............. G01S 17/10 |

OTHER PUBLICATIONS

Shrivathsa, V. "Cell Averaging-Constant False Alarm Rate Detection in Radar." International Research Journal of Engineering and Technology (IRJET) 7 (2018): 2433-2438. (Year: 2018).*

* cited by examiner

OBJECT DETECTION DEVICE

CROSS REFERENCE TO RELATED APPLICATIONS

This application is based on and claims priority under 35 U.S.C. § 119 to Japanese Patent Application 2021-001721, filed on Jan. 7, 2021, the entire content of which is incorporated herein by reference.

TECHNICAL FIELD

This disclosure relates to an object detection device.

BACKGROUND DISCUSSION

In the related art, in a technique for detecting information related to an object based on a transmission and reception of a radar, constant false alarm rate (CFAR) processing is known as processing for reducing noise, called clutter, which is generate due to a reflection by an object that is not a detection target. According to the CFAR processing, it is possible to acquire a CFAR signal corresponding to a signal obtained by removing the clutter from a processing target signal by using a moving average of a value (signal level) of the processing target signal based on a reception wave.

Examples of the related art include JP 2006-292597A (Reference 1).

Here, in general, a transmission wave and the reception wave are absorbed and attenuated due to influences such as a temperature of a medium through which the transmission wave and the reception wave propagate. Therefore, both the processing target signal and the clutter described above include the influences of the absorption and the attenuation. Therefore, it is considered that when the information related to the object is detected by using the CFAR signal, it is desirable to consider the influences of the absorption and the attenuation.

However, as described above, the CFAR signal corresponds to a signal obtained by removing the clutter from the processing target signal. Therefore, in a section in which the clutter is negligibly small with respect to the processing target signal, a CFAR signal including the influences of the absorption and the attenuation of the processing target signal is obtained, and in a section in which the clutter is too large to be ignored with respect to the processing target signal, a CFAR signal in which the influences of the absorption and the attenuation between the clutter and the processing target signal cancel each other out is obtained.

As described above, since it is not uniform whether the CFAR signal includes the influences of the absorption and the attenuation, in order to appropriately detect the information related to the object by using the CFAR signal, it is necessary to appropriately switch whether to consider the influences of the absorption and the attenuation.

A need thus exists for an object detection device which is not susceptible to the drawback mentioned above.

SUMMARY

An object detection device according to an aspect of this disclosure includes: a transmitter configured to transmit a transmission wave; a receiver configured to receive a reception wave which is the transmission wave returned by being reflected by an object; a CFAR processor configured to acquire a CFAR signal at a detection timing by CFAR processing based on a value of a first processing target signal based on a reception wave received at the detection timing and an average value of values of second processing target signals based on reception waves received in predetermined sections before and after the detection timing; a detection processor configured to detect information related to the object based on a comparison between the CFAR signal and a threshold; and a threshold processor configured to, in a case in which the detection timing belongs to a predetermined first section, set the threshold as a first threshold calculated in consideration of a detection result of a temperature sensor that detects a temperature of a medium through which the transmission wave and the reception wave propagate, and in a case in which the detection timing belongs to a predetermined second section different from the first section, set the threshold as a second threshold calculated without considering the detection result of the temperature sensor.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment and a modification disclosed here will be described with reference to the drawings. Configurations of the embodiment and the modification described below and actions and effects provided by the configurations are merely examples, and are not limited to the following description.

Embodiment

Figure 1:
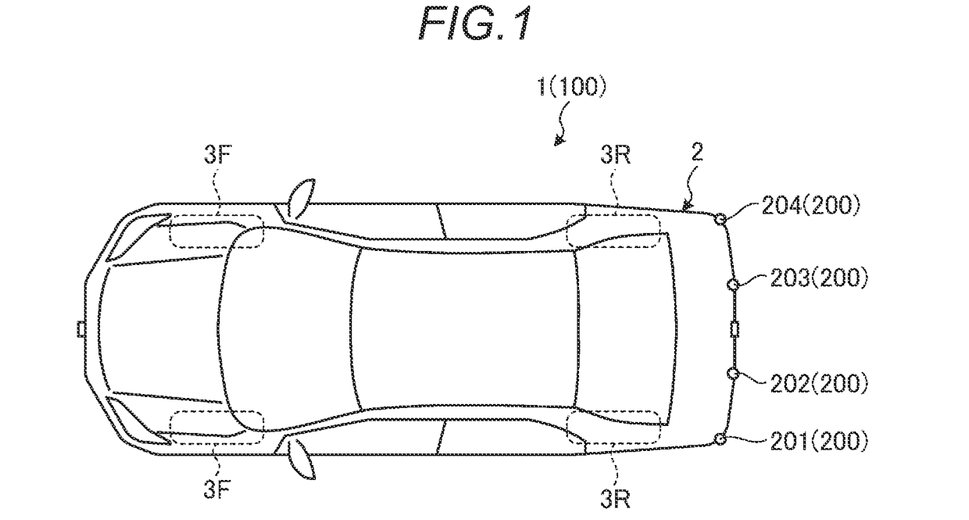
FIG. 1 is an exemplary and schematic diagram illustrating an appearance of a vehicle including an object detection system according to an embodiment when viewed from above.

FIG. 1 is an exemplary and schematic view illustrating an appearance of a vehicle 1 including an object detection system according to an embodiment when viewed from above.

As described below, the object detection system according to the embodiment is an in-vehicle sensor system that performs a transmission and reception of a sound wave (ultrasonic wave) and acquires a time difference or the like of the transmission and reception, thereby detecting information related to an object (for example, an obstacle O illustrated in FIG. 2 to be described later) including a person present around the object detection system.

More specifically, as illustrated in FIG. 1, the object detection system according to the embodiment includes an electronic control unit (ECU) 100 as an in-vehicle control device and object detection devices 201 to 204 as in-vehicle sonars. The ECU 100 is mounted inside the four-wheel vehicle 1 including a pair of front wheels 3F and a pair of rear wheels 3R, and the object detection devices 201 to 204 are mounted on an exterior of the vehicle 1.

In the example illustrated in FIG. 1, as an example, the object detection devices 201 to 204 are installed at different positions on a rear end portion (rear bumper) of a vehicle body 2 as the exterior of the vehicle 1, but the installation positions of the object detection devices 201 to 204 are not limited to the example illustrated in FIG. 1. For example, the object detection devices 201 to 204 may be installed on a front end portion (front bumper) of the vehicle body 2, may be installed on a side surface portion of the vehicle body 2, or may be installed on two or more of the rear end portion, the front end portion, and the side surface portion.

Further, in the embodiment, hardware configurations and functions of the object detection devices 201 to 204 are the same as each other. Therefore, in the following description, the object detection devices 201 to 204 may be collectively referred to as an object detection device 200 for simplification. Further, in the embodiment, the number of object detection devices 200 is not limited to four as illustrated in FIG. 1.

Figure 2:
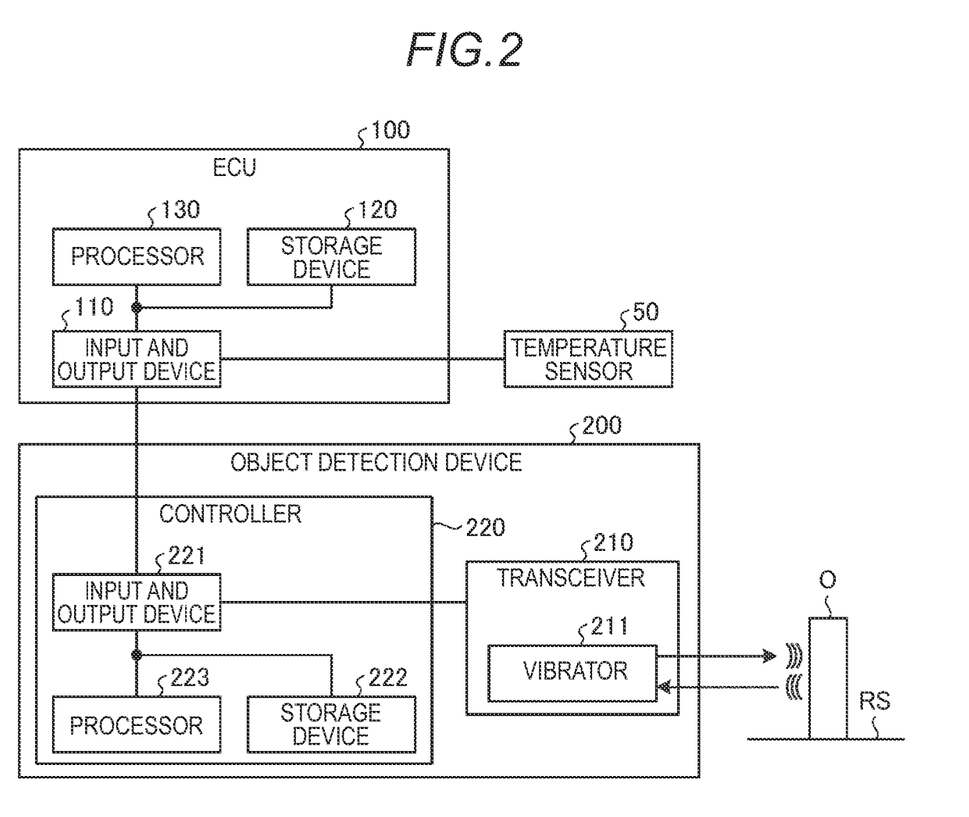
FIG. 2 is an exemplary and schematic block diagram illustrating a hardware configuration of the object detection system according to the embodiment.

FIG. 2 is an exemplary and schematic block diagram illustrating a hardware configuration of the object detection system according to the embodiment.

As illustrated in FIG. 2, the ECU 100 has a hardware configuration similar to that of a normal computer. More specifically, the ECU 100 includes an input and output device 110, a storage device 120, and a processor 130.

The input and output device 110 is an interface for implementing the transmission and reception of information between the ECU 100 and an outside. For example, in the example illustrated in FIG. 2, communication partners of the ECU 100 are the object detection device 200 and a temperature sensor 50. The temperature sensor 50 is mounted on the vehicle 1 so as to measure a temperature around the vehicle 1.

The storage device 120 includes a main storage device such as a read only memory (ROM) or a random access memory (RAM), and/or an auxiliary storage device such as a hard disk drive (HDD) or a solid state drive (SSD).

The processor 130 manages various processing executed by the ECU 100. The processor 130 includes an arithmetic unit, for example, a central processing unit (CPU), and the like. The processor 130 reads and executes a computer program stored in the storage device 120, thereby implementing various functions, for example, automatic parking, and the like.

As illustrated in FIG. 2, the object detection device 200 includes a transceiver 210 and a controller 220.

The transceiver 210 includes a vibrator 211 including a piezoelectric element or the like, and the transmission and reception of the ultrasonic wave is implemented by the vibrator 211.

More specifically, the transceiver 210 transmits, as a transmission wave, an ultrasonic wave generated in accordance with a vibration of the vibrator 211, and receives, as a reception wave, the vibration of the vibrator 211 caused by the ultrasonic wave transmitted as the transmission wave being reflected by an object present outside and returned. In the example illustrated in FIG. 2, the obstacle O installed on a road surface RS is illustrated as the object that reflects the ultrasonic wave from the transceiver 210.

In the example illustrated in FIG. 2, a configuration in which both the transmission of the transmission wave and the reception of the reception wave are implemented by the single transceiver 210 including the single vibrator 211 is illustrated. However, the technique of the embodiment is also applicable to a configuration in which a configuration on a transmission side and a configuration on a reception side are separated, for example, a configuration in which a first vibrator for transmitting the transmission wave and a second vibrator for receiving the reception wave are separately provided.

The controller 220 has a hardware configuration similar to that of a normal computer. More specifically, the controller 220 includes an input and output device 221, a storage device 222, and a processor 223.

The input and output device 221 is an interface for implementing the transmission and reception of information between the controller 220 and an outside (the ECU 100 and the transceiver 210 in the example illustrated in FIG. 1).

The storage device 222 includes a main storage device such as a ROM or a RAM, and an auxiliary storage device such as an HDD or an SSD.

The processor 223 manages various processing executed by the controller 220. The processor 223 includes an arithmetic unit, for example, a CPU, and the like. The processor 223 reads and executes a computer program stored in a storage device 333, thereby implementing various functions.

Here, the object detection device 200 according to the embodiment detects a distance to the object by a technique referred to as a time of flight (TOF) method. As described in detail below, the TOF method is a technique of calculating a distance to the object in consideration of a difference between a timing at which the transmission wave is transmitted (more specifically, the transmission is started) and a timing at which the reception wave is received (more specifically, the reception is started).

Figure 3:
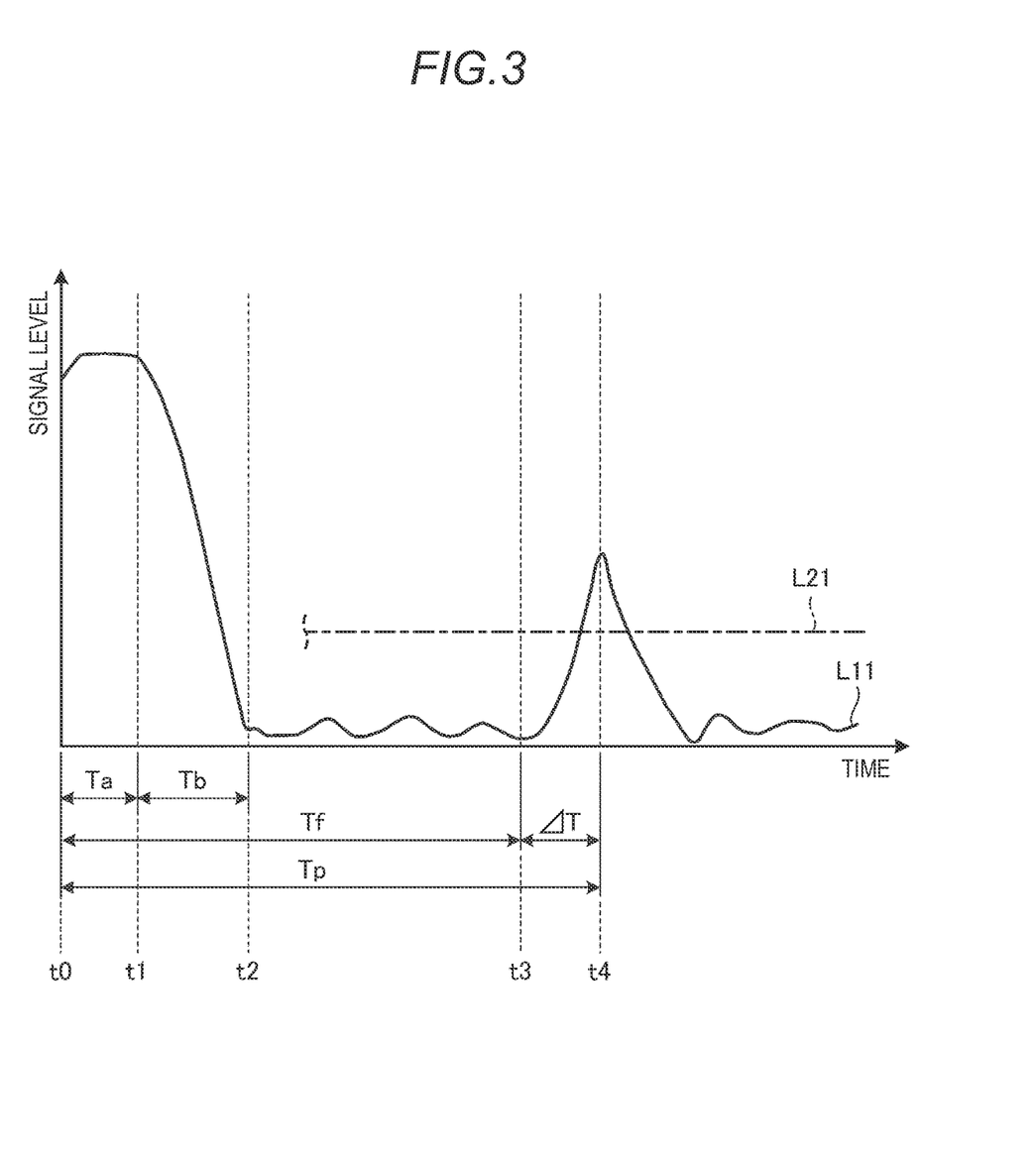
FIG. 3 is an exemplary and schematic diagram illustrating an outline of a technique used by an object detection device according to the embodiment to detect a distance to an object.

FIG. 3 is an exemplary and schematic diagram illustrating an outline of a technique used by the object detection device 200 according to the embodiment to detect a distance to the object.

More specifically, FIG. 3 is an exemplary and schematic diagram represented in a graph form that illustrates a temporal change in a signal level (for example, amplitude) of the ultrasonic wave transmitted and received by the object detection device 200 according to the embodiment. In the graph illustrated in FIG. 3, a horizontal axis corresponds to a time, and a vertical axis corresponds to a signal level of a signal transmitted and received by the object detection device 200 via the transceiver 210 (the vibrator 211).

In the graph illustrated in FIG. 3, a solid line L11 represents an example of an envelope curve representing a temporal change in the signal level of the signal transmitted and received by the object detection device 200, that is, a vibration degree of the vibrator 211. It can be seen from the solid line L11 that by driving and vibrating the vibrator 211 for a time Ta from a timing t0, the transmission of the transmission wave is completed at a timing t1, and then during a time Tb until a timing t2, the vibration of the vibrator 211 due to inertia continues while attenuating. Therefore, in the graph illustrated in FIG. 3, the time Tb corresponds to a so-called reverberation time.

The solid line L11 reaches a peak at which the vibration degree of the vibrator 211 exceeds (or equal to or more than) a predetermined threshold Th1 represented by a one-dot chain line L21 at a timing t4 at which a time Tp elapses from the timing t0 at which the transmission of the transmission wave is started. The threshold Th1 is a value set in advance for identifying whether the vibration of the vibrator 211 is caused by a reception of a reception wave which is the transmission wave returned by being reflected by a detection target object (for example, the obstacle O illustrated in FIG. 2) or is caused by a reception of a reception wave which is the transmission wave returned by being reflected by a non-detection target object (for example, the road surface RS illustrated in FIG. 2).

FIG. 3 illustrates an example in which the threshold Th1 is set as a constant value that does not change as the time elapses, but in the embodiment, the threshold Th1 may be set as a value that changes as the time elapses.

Here, the vibration having a peak exceeding (or equal to or more than) the threshold Th1 can be considered to be caused by the reception of the reception wave which is the transmission wave returned by being reflected by the detection target object. On the other hand, the vibration having a peak equal to or lower than (or less than) the threshold Th1 can be considered to be caused by the reception of the reception wave which is the transmission wave returned by being reflected by the object not to be detected.

Therefore, based on the solid line L11, it can be seen that the vibration of the vibrator 211 at the timing t4 is caused by the reception of the reception wave which is the transmission wave returned by being reflected by the detection target object.

Further, in the solid line L11, the vibration of the vibrator 211 is attenuated after the timing t4. Therefore, the timing t4 corresponds to a timing at which the reception of the reception wave which is the transmission wave returned by being reflected by the detection target object is completed, in other words, a timing at which the transmission wave last transmitted at the timing t1 returns as the reception wave.

Further, in the solid line L11, a timing t3 as a start point of the peak at the timing t4 corresponds to a timing at which the reception of the reception wave which is the transmission wave returned by being reflected by the detection target object is started, in other words, a timing at which the transmission wave first transmitted at the timing t0 returns as the reception wave. Therefore, in the solid line L11, a time $\Delta T$ between the timing t3 and the timing t4 is equal to the time Ta as a transmission time of the transmission wave.

Based on the above, in order to obtain a distance to the detection target object by the TOF method, it is necessary to obtain a time Tf between the timing t0 at which the transmission wave starts to be transmitted and the timing t3 at which the reception wave starts to be received. The time Tf can be obtained by subtracting the time $\Delta T$ equal to the time Ta as the transmission time of the transmission wave from the time Tp as a difference between the timing t0 and the timing t4 at which the signal level of the reception wave reaches the peak exceeding the threshold Th1.

The timing t0 at which the transmission wave starts to be transmitted can be easily specified as a timing at which the object detection device 200 starts to operate, and the time Ta as the transmission time of the transmission wave is determined in advance by setting or the like. Therefore, in order to obtain the distance to the detection target object by the TOF method, it is important to specify the timing t4 at which the signal level of the reception wave reaches the peak exceeding the threshold Th1. In order to specify the timing t4, it is important to accurately detect a correspondence between the transmission wave and the reception wave which is the transmission wave returned by being reflected by the detection target object.

However, in the related art, in a case where information related to an object is detected based on a transmission and reception of a wave such as an ultrasonic wave described above, constant false alarm rate (CFAR) processing is known as processing for reducing noise, called clutter, which is generated due to a reflection by an object that is not a detection target. According to the CFAR processing, it is possible to acquire a CFAR signal corresponding to a signal obtained by removing the clutter from the processing target signal by using a moving average of a value (signal level) of the processing target signal based on a reception wave.

Here, in general, the transmission wave and the reception wave are absorbed and attenuated due to influences such as a temperature of a medium through which the transmission wave and the reception wave propagate. Therefore, both the processing target signal and the clutter described above include the influences of the absorption and the attenuation. Therefore, it is considered that when the information related to the object is detected by using the CFAR signal, it is desirable to consider the influences of the absorption and the attenuation.

However, as described above, the CFAR signal corresponds to a signal obtained by removing the clutter from a processing target signal. Therefore, in a section in which the clutter is negligibly small with respect to the processing target signal, a CFAR signal including the influences of the absorption and the attenuation of the processing target signal is obtained, and in a section in which the clutter is too large to be ignored with respect to the processing target signal, a CFAR signal in which the influences of the absorption and the attenuation between the clutter and the processing target signal cancel each other out is obtained.

As described above, since whether the CFAR signal includes the influences of the absorption and the attenuation is not uniform, in order to appropriately detect the information related to the object by using the CFAR signal, it is necessary to appropriately switch whether to consider the influences of the absorption and the attenuation.

Therefore, in the embodiment, the object detection device 200 is configured as follows, thereby implementing proper detection of the object based on the CFAR signal while switching whether to consider the influences of the absorption and the attenuation.

Figure 4:
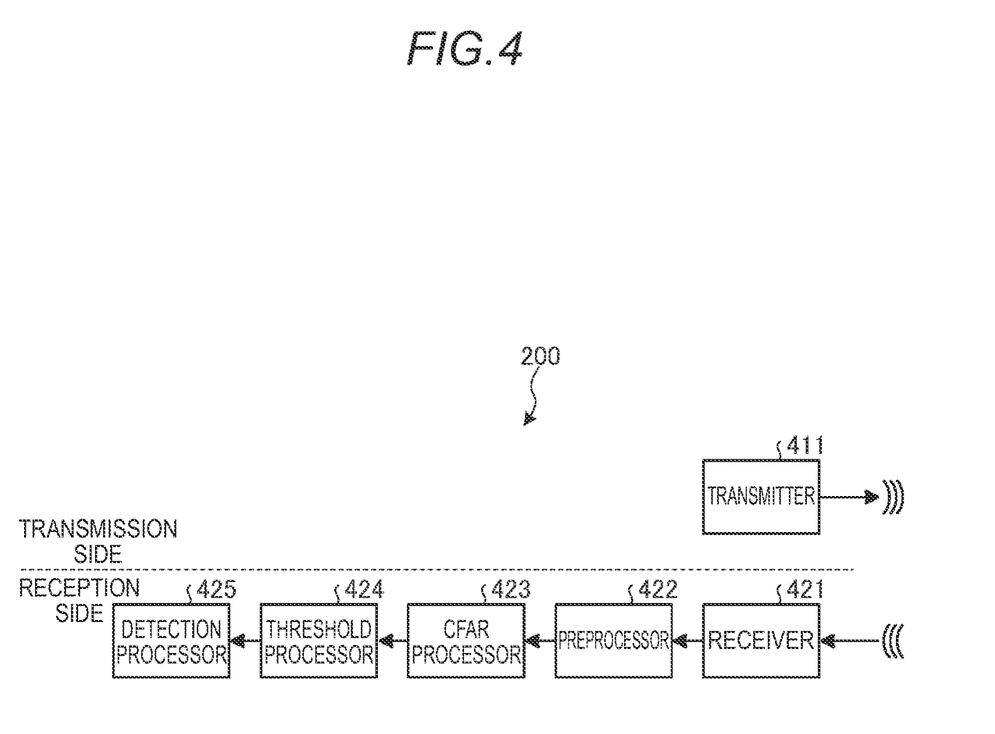
FIG. 4 is an exemplary and schematic block diagram illustrating functions of the object detection device according to the embodiment.

FIG. 4 is an exemplary and schematic block diagram illustrating a detailed configuration of the object detection device 200 according to the embodiment.

In FIG. 4, the configuration on the transmission side and the configuration on the reception side are illustrated in a separated state, but such an aspect illustrated in the drawing is merely for convenience of description. Therefore, in the embodiment, as described above, both the transmission of the transmission wave and the reception of the reception wave are implemented by the single transceiver 210. However, as described above, the technique of the embodiment is also applicable to the configuration in which the configuration on the transmission side and the configuration on the reception side are separated from each other.

As illustrated in FIG. 4, the object detection device 200 includes a transmitter 411 as a configuration on the transmission side. Further, the object detection device 200 includes, as a configuration on the reception side, a receiver 421, a preprocessor 422, a CFAR processor 423, a threshold processor 424, and a detection processor 425.

Further, in the embodiment, at least a part of the configurations illustrated in FIG. 4 may be implemented as a result of a cooperation between hardware and software, more specifically, as a result of the processor 223 of the object detection device 200 reading the computer program from the storage device 222 and executing the computer program. However, in the embodiment, at least a part of the configurations illustrated in FIG. 4 may be implemented by dedicated hardware (circuitry). Further, in the embodiment, each configuration illustrated in FIG. 4 may operate under a control of the controller 220 of the object detection device 200 itself, or may operate under a control of the external ECU 100.

First, the configuration on the transmission side will be described.

The transmitter 411 transmits a transmission wave to an outside by vibrating the above-described vibrator 211 at a predetermined transmission interval. The transmission interval is a time interval from the transmission of the transmission wave to a next transmission of the transmission wave. The transmitter 411 is configured by using, for example, a circuit that generates a carrier wave, a circuit that generates a pulse signal corresponding to identification information to be given to the carrier wave, a multiplier that modulates the carrier wave according to the pulse signal, an amplifier that amplifies a transmission signal output from the multiplier, and the like.

Next, the configuration on the reception side will be described.

The receiver 421 receives the reception wave which is a reflected wave of the transmission wave transmitted from the transmitter 411 until a predetermined measurement time elapses after the transmission wave is transmitted. The measurement time is a standby time set for receiving the reception wave which is the reflected wave of the transmission wave after the transmission wave is transmitted.

The preprocessor 422 performs preprocessing for converting a reception signal corresponding to the reception wave received by the receiver 421 into a processing target signal to be input to the CFAR processor 423. The preprocessing includes, for example, amplification processing of amplifying a reception signal corresponding to a reception wave, filter processing of reducing noise included in the amplified reception signal, correlation processing of acquiring a correlation value indicating a similarity degree between the transmission signal and the reception signal, envelope curve processing of generating a signal based on an envelope curve of a waveform indicating a temporal change of the correlation value as a processing target signal, and the like.

The CFAR processor 423 acquires the CFAR signal by performing the CFAR processing on the processing target signal output from the preprocessor 422. As described above, the CFAR processing is processing of acquiring a CFAR signal corresponding to a signal obtained by removing the clutter from the processing target signal by using a moving average of a value (signal level) of the processing target signal.

Figure 5:
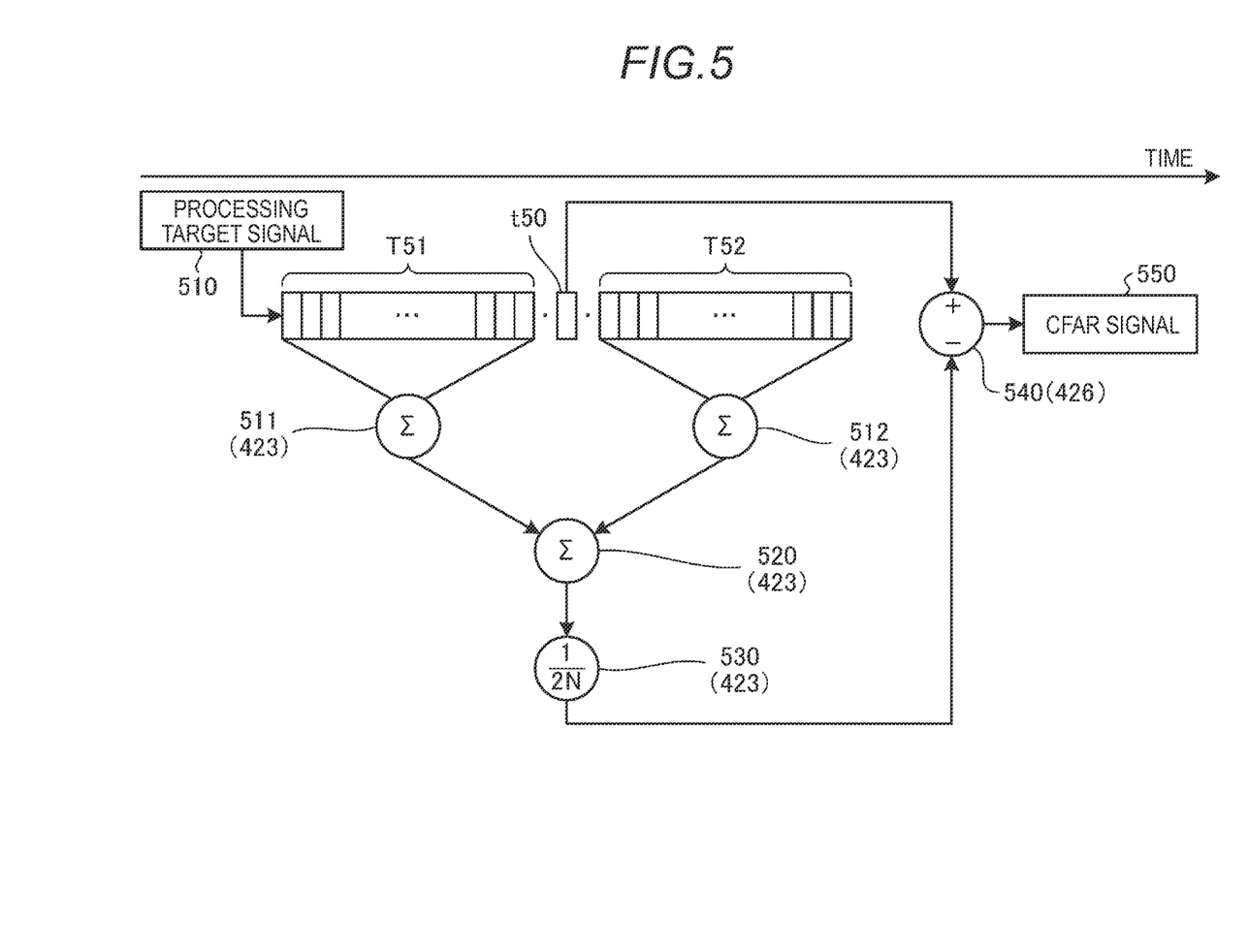
FIG. 5 is an exemplary and schematic diagram illustrating an example of constant false alarm rate (CFAR) processing that may be executed in the embodiment.

For example, the CFAR processor 423 according to the embodiment acquires a CFAR signal with a configuration as illustrated in FIG. 5.

FIG. 5 is an exemplary and schematic diagram illustrating an example of a CFAR processing that may be executed in the embodiment.

As illustrated in FIG. 5, in the CFAR processing, first, a processing target signal 510 is sampled at a predetermined time interval. Then, an arithmetic unit 511 of the CFAR processor 423 calculates a sum of values of the processing target signals for N samples corresponding to the reception waves received in a section T51 that is present before a detection timing t50. Further, an arithmetic unit 512 of the CFAR processor 423 calculates a sum of values of the processing target signals for N samples corresponding to the reception waves received in a section T52 that is present after the detection timing t50.

Then, an arithmetic unit 520 of the CFAR processor 423 adds the calculation results of the arithmetic units 511 and 512. Then, an arithmetic unit 530 of the CFAR processor 423 divides the calculation result of the arithmetic unit 520 by 2N which is a sum of the number N of samples of the processing target signals in the section T51 and the number N of samples of the processing target signals in the section T52, and calculates an average value of the values of the processing target signals in both the sections T51 and T52.

Then, an arithmetic unit 540 of the CFAR processor 423 subtracts the average value as the calculation result of the arithmetic unit 530 from the value of the processing target signal at the detection timing t50 and acquires a CFAR signal 550.

As described above, the CFAR processor 423 according to the embodiment samples the processing target signal based on the reception wave, and acquires a CFAR signal based on a difference between a value of a first processing target signal for (at least) one sample based on the reception wave received at a certain detection timing and an average value of values of second processing target signals for a plurality of samples based on the reception waves received in the predetermined sections T51 and T52 before and after the detection timing.

In the above description, as an example of the CFAR processing, the processing of acquiring the CFAR signal based on the difference between the value of the first processing target signal and the average value of the values of the second processing target signals is illustrated. However, the CFAR processing according to the embodiment may be processing of acquiring a CFAR signal based on a ratio between the value of the first processing target signal and the average value of the values of the second processing target signals, or may be processing of acquiring a CFAR signal based on normalization of the difference between the value of the first processing target signal and the average value of the values of the second processing target signals.

Here, as described above, the CFAR signal corresponds to a signal obtained by removing the clutter from a processing target signal. More specifically, the CFAR signal corresponds to a signal obtained by removing various kinds of noise including the clutter and stationary noise generated stationarily in the transceiver 210 from the processing target signal. The processing target signal and the noise (clutter and stationary noise) are illustrated as waveforms as illustrated in FIG. 6 below, for example.

Figure 6:
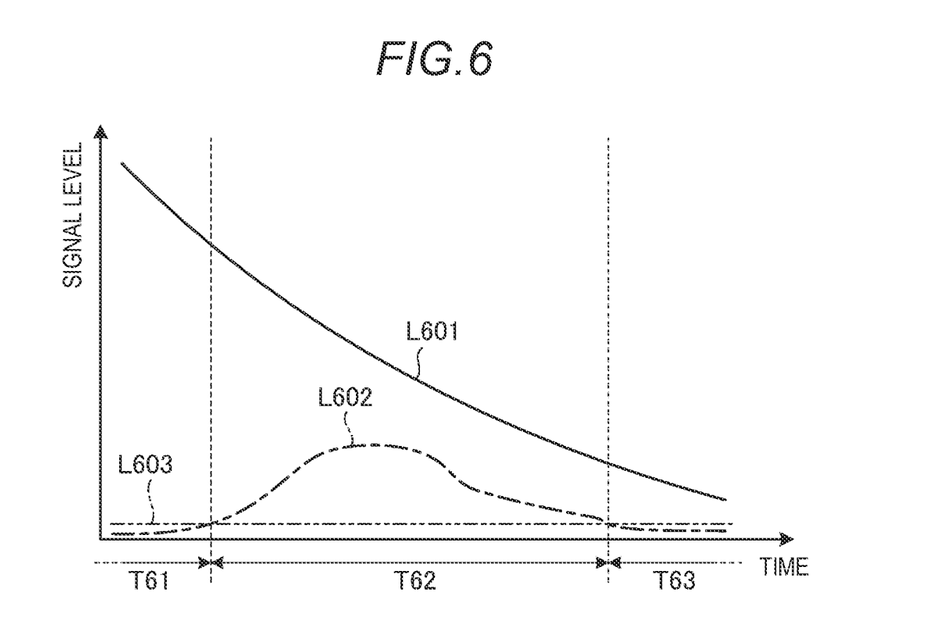
FIG. 6 is an exemplary and schematic diagram illustrating an example of a processing target signal and noise according to the embodiment.

FIG. 6 is an exemplary and schematic diagram illustrating an example of the processing target signal and noise according to the embodiment.

In the example illustrated in FIG. 6, a solid line L601 represents a temporal change of the value of the processing target signal, a one-dot chain line L602 represents a temporal change of the value of the clutter, and a two-dot chain line L603 represents a temporal change of the value of the stationary noise.

As illustrated in FIG. 6, a magnitude relation between the values of the clutter (see the one-dot chain line L602) and the stationary noise (see the two-dot chain line L603) changes for each section. For example, in the example illustrated in FIG. 6, the value of the stationary noise is larger than the value of the clutter in a section T61, the value of the clutter is larger than the value of the stationary noise in a section T62 next to the section T61, and the value of the stationary noise is larger than the value of the clutter in a section T63 next to the section T62.

Further, a timing at which the value of the clutter increases is substantially determined in advance in accordance with an installation position and an installation attitude of the transceiver 210. The value of the stationary noise is also substantially determined in advance. Therefore, the sections T61 to T63 are substantially determined in advance in accordance with the installation position and the installation attitude of the transceiver 210. Further, a start point of the section T61 coincides with a start point of the measurement time described above as the standby time of the receiver 421 set for receiving the reception wave which is the reflected wave of the transmission wave, and an end point of the section T63 coincides with an end point of the measurement time described above.

Here, in the sections T61 and T63, since the clutter is negligibly small with respect to the processing target signal, the CFAR signal corresponding to the signal obtained by removing the clutter and the stationary noise from the processing target signal is a signal including the influences of the absorption and the attenuation of the processing target signal without including the influences of the absorption and the attenuation of the clutter. On the other hand, in the section T62, since the clutter is too large to be ignored with respect to the processing target signal, the CFAR signal is a signal that does not include the influences of the absorption and the attenuation because the influences of the absorption and the attenuation of the clutter and the influences of the absorption and the attenuation of the processing target signal cancel each other out.

Based on the above, returning to FIG. 4, the threshold processor 424, in a case in which the detection timing belongs to the section T61 or T63, sets a threshold to be compared with the value of the CFAR signal for detecting the information related to the object to a first threshold calculated in consideration of the influences of the absorption and the attenuation described above, and in a case in which the detection timing belongs to the section T62, sets the threshold to be compared with the value of the CFAR signal to a second threshold calculated without considering the influences of the absorption and the attenuation described above. In addition, the influences of the absorption and the attenuation can be estimated based on at least the detection result of the temperature sensor 50 acquired via the ECU 100.

Then, the detection processor 425 specifies a detection timing at which the value of the CFAR signal exceeds the threshold based on a comparison between the value of the CFAR signal and the threshold (the first threshold or the second threshold) set by the threshold processor 424. Since the detection timing at which the value of the CFAR signal exceeds the threshold coincides with a timing at which the signal level of the reception wave which is the transmission wave returned by being reflected by the object reaches a peak, when the detection timing at which the value of the CFAR signal exceeds the threshold is specified, the distance to the object can be detected by the TOF method described above.

As described above, in the embodiment, instead of using a uniform threshold for all of the sections where the CFAR signals are acquired, two kinds of thresholds, that is, the first threshold in consideration of the influences of the absorption and the attenuation and the second threshold that does not consider the influences of the absorption and the attenuation, are used for each section determined in advance in accordance with the installation position and the installation attitude of the transceiver 210. That is, in the embodiment, a value of a CFAR signal having a waveform as illustrated in, for example, FIG. 7 is compared with a threshold different for each section.

Figure 7:
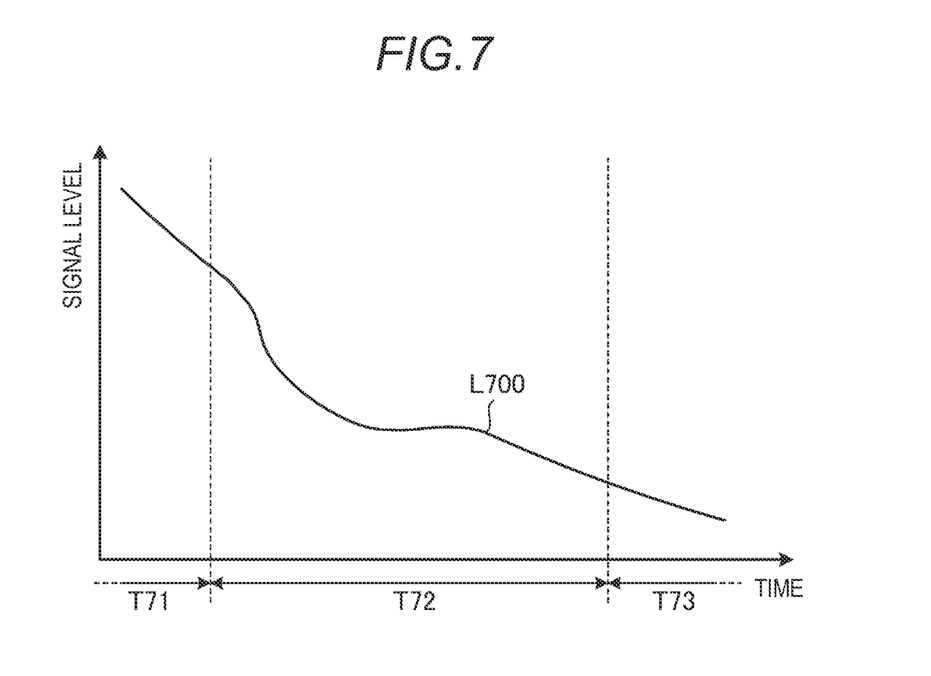
FIG. 7 is an exemplary and schematic diagram illustrating an example of a CFAR signal according to the embodiment.

FIG. 7 is an exemplary and schematic diagram illustrating an example of a CFAR signal according to the embodiment.

In the example illustrated in FIG. 7, a solid line L700 represents a temporal change in the value of the CFAR signal. The solid line L700 corresponds to a difference between the solid line L601 and a larger value of the one-dot chain line L602 and the two-dot chain line L603 illustrated in FIG. 6. Therefore, in the example illustrated in FIG. 7, sections T71, T72, and T73 correspond to the sections T61, T62, and T63 illustrated in FIG. 6, respectively.

In the example illustrated in FIG. 7, in the sections T71 and T73, the first threshold calculated in consideration of the influences of the absorption and the attenuation is set as a threshold to be compared with the value of the solid line L700, and in the section T72, the second threshold calculated without considering the influences of the absorption and the attenuation is set as a threshold to be compared with the value of the solid line L700. That is, in the example illustrated in FIG. 7, in the sections T71 and T73, the distance to the object is detected by comparing the value of the solid line L700 with the first threshold, and in the section T72, the distance to the object is detected by comparing the value of the solid line L700 with the second threshold.

Figure 8:
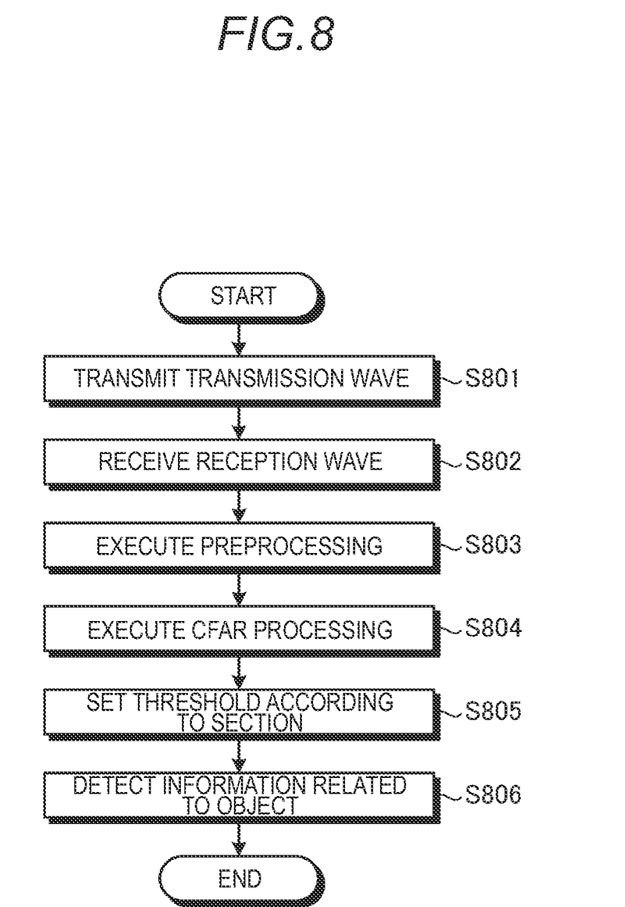
FIG. 8 is an exemplary and schematic flowchart illustrating a series of processing executed by the object detection system according to the embodiment.

Based on the above configuration, the object detection system according to the embodiment executes processing in a flow as illustrated in FIG. 8. The series of processing illustrated in FIG. 8 may be repeatedly executed, for example, at a predetermined control cycle.

FIG. 8 is an exemplary and schematic flowchart illustrating a series of processing executed by the object detection system according to the embodiment.

As illustrated in FIG. 8, in the embodiment, first, in S801, the transmitter 411 of the object detection device 200 transmits a transmission wave.

Then, in S802, the receiver 421 of the object detection device 200 receives a reception wave corresponding to the transmission wave transmitted in S801.

Then, in S803, the preprocessor 422 of the object detection device 200 executes preprocessing for next processing of S804 on a reception signal corresponding to the reception wave received in S802.

Then, in S804, the CFAR processor 423 of the object detection device 200 executes CFAR processing on the processing target signal output from the preprocessor 422 through the preprocessing in S803, and generates a CFAR signal.

Then, in S805, the threshold processor 424 of the object detection device 200 sets a threshold (the first threshold or the second threshold described above) for each predetermined section with respect to the CFAR signal generated in S804.

Then, in S806, the detection processor 425 of the object detection device 200 detects a distance to an object based on the comparison between a value of the CFAR signal and the threshold set in S805. Then, the processing ends.

As described above, the object detection device 200 according to the embodiment includes the transmitter 411, the receiver 421, the CFAR processor 423, the detection processor 425, and the threshold processor 424. The transmitter 411 transmits a transmission wave, and the receiver 421 receives a reception wave which is the transmission wave returned by being reflected by an object. The CFAR processor 423 acquires a CFAR signal at the detection timing by the CFAR processing based on the value of the first processing target signal based on the reception wave received at a detection timing and the average value of the values of the second processing target signal based on the reception waves received in a predetermined section before and after the detection timing. The detection processor 425 detects information related to the object based on a comparison between the CFAR signal and the threshold. The threshold processor 424, in a case in which the detection timing belongs to a predetermined first section, sets the threshold as a first threshold calculated in consideration of a detection result of the temperature sensor 50 that detects a temperature of a medium through which the transmission wave and the reception wave propagate, and in a case in which the detection timing belongs to a predetermined second section different from the first section, sets the threshold as a second threshold calculated without considering the detection result of the temperature sensor 50.

According to the object detection device 200 in the embodiment, it is possible to appropriately execute a detection of the object based on the CFAR signal while switching for each section between the first threshold calculated in consideration of the detection result of the temperature sensor 50, that is, in consideration of influences of absorption and attenuation and the second threshold calculated without considering the detection result of the temperature sensor 50, that is, without considering the influences of the absorption and the attenuation.

Here, in the embodiment, the transmission of the transmission wave by the transmitter 411 and the reception of the reception wave by the receiver 421 are performed by using the same transceiver 210 fixedly installed at a predetermined position and a predetermined attitude. The first section and the second section are determined in advance in accordance with the installation position and the installation attitude of the transceiver 210. According to such a configuration, it is possible to determine the first section and the second section in advance in consideration of the installation position and the installation attitude of the transceiver 210 related to a timing at which a value of clutter increases.

More specifically, in the embodiment, the first section is determined in advance in accordance with the installation position and the installation attitude of the transceiver 210 as a section in which a value of clutter based on a reception wave obtained by a reflection from a non-detection target as the object that is not a target for detecting information related to the object is equal to or less than a predetermined value. The second section is determined in advance in accordance with the installation position and the installation attitude of the transceiver as a section in which the value of the clutter becomes larger than the predetermined value. According to such a configuration, it is possible to easily determine a boundary between the first section and the second section.

Further, in the embodiment, the predetermined value corresponds to stationary noise which is stationarily generated in the transceiver 210. According to such a configuration, the boundary between the first section and the second section in consideration of the stationary noise can be appropriately determined.

<Modification>

In the embodiment described above, the technique disclosed here is applied to a configuration in which a distance to an object is detected by a transmission and reception of an ultrasonic wave. However, the technique disclosed here can also be applied to a configuration in which a distance to an object is detected by a transmission and reception of a wave other than the ultrasonic wave, such as a sound wave, a millimeter wave, a radar, and an electromagnetic wave.

Further, in the embodiment described above, a configuration is illustrated in which a detection result of a temperature sensor mounted on a vehicle is used for a calculation of the first threshold in consideration of the influences of the absorption and the attenuation. However, if the vehicle is equipped with a humidity sensor in addition to the temperature sensor, it is expected that the influences of the absorption and the attenuation can be estimated more accurately and a more appropriate first threshold can be calculated by further using the detection result of the humidity sensor in addition to that of the temperature sensor.

An object detection device according to an aspect of this disclosure includes: a transmitter configured to transmit a transmission wave; a receiver configured to receive a reception wave which is the transmission wave returned by being reflected by an object; a CFAR processor configured to acquire a CFAR signal at a detection timing by CFAR processing based on a value of a first processing target signal based on a reception wave received at the detection timing and an average value of values of second processing target signals based on reception waves received in predetermined sections before and after the detection timing; a detection processor configured to detect information related to the object based on a comparison between the CFAR signal and a threshold; and a threshold processor configured to, in a case in which the detection timing belongs to a predetermined first section, set the threshold as a first threshold calculated in consideration of a detection result of a temperature sensor that detects a temperature of a medium through which the transmission wave and the reception wave propagate, and in a case in which the detection timing belongs to a predetermined second section different from the first section, set the threshold as a second threshold calculated without considering the detection result of the temperature sensor.

According to the object detection device described above, a detection of the object based on the CFAR signal can be appropriately executed while switching for each section between the first threshold calculated in consideration of the detection result of the temperature sensor, that is, in consideration of influences of absorption and attenuation and the second threshold calculated without considering the detection result of the temperature sensor, that is, without considering the influences of the absorption and the attenuation.

In the object detection device described above, the transmission of the transmission wave by the transmitter and the reception of the reception wave by the receiver may be performed by using a same transceiver fixedly installed at a predetermined position and a predetermined attitude, and the first section and the second section may be determined in advance in accordance with an installation position and an installation attitude of the transceiver. According to such a configuration, the first section and the second section can be determined in advance in consideration of the installation position and the installation attitude of the transceiver related to a timing at which a value of clutter increases.

In this case, the first section may be determined in advance in accordance with the installation position and the installation attitude of the transceiver as a section in which a value of clutter based on the reception wave obtained by a reflection from a non-detection target as the object that is not a target for detecting the information related to the object is equal to or less than a predetermined value, and the second section may be determined in advance in accordance with the installation position and the installation attitude of the transceiver as a section in which the value of the clutter is larger than the predetermined value. According to such a configuration, a boundary between the first section and the second section can be easily determined.

Further, in this case, the predetermined value may correspond to stationary noise which is stationarily generated in the transceiver. According to such a configuration, it is possible to appropriately determine the boundary between the first section and the second section in consideration of the stationary noise.

Further, in the object detection device described above, the CFAR processor may acquire the CFAR signal by any one of first CFAR processing based on a difference between the value of the first processing target signal and the average value of the values of the second processing target signals, second CFAR processing based on a ratio between the value of the first processing target signal and the average value of the values of the second processing target signals, and third CFAR processing based on normalization of the difference between the value of the first processing target signal and the average value of the values of the second processing target signals. According to such a configuration, the CFAR signal can be easily acquired by using any one of the three CFAR processing.

Further, in the object detection device described above, the detection processor may detect a distance to the object as the information related to the object. According to such a configuration, it is possible to acquire the distance as useful information related to the object.

While embodiments and modifications disclosed here have been described, these embodiments and modifications have been presented by way of example only, and are not intended to limit the scope of the inventions. Indeed, these embodiments and modifications described herein may be embodied in a variety of forms; furthermore, various omissions, substitutions and changes in the form of these embodiments and modifications described herein may be made without departing from the spirit of the inventions. The accompanying claims and their equivalents are intended to cover such forms or modifications as would fall within the scope and spirit of the inventions.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An object detection device comprising:
a transmitter configured to transmit a transmission wave;
a receiver configured to receive a reception wave which is the transmission wave returned by being reflected by an object;
a CFAR processor configured to acquire a CFAR signal at a detection timing by CFAR processing based on a value of a first processing target signal based on a reception wave received at the detection timing and an average value of values of second processing target signals based on reception waves received in predetermined sections before and after the detection timing;
a detection processor configured to detect information related to the object based on a comparison between the CFAR signal and a threshold; and
a threshold processor configured to, in a case in which the detection timing belongs to a predetermined first section, set the threshold as a first threshold calculated in consideration of a detection result of a temperature sensor that detects a temperature of a medium through which the transmission wave and the reception wave propagate, in a case in which the detection timing belongs to a predetermined second section different from the first section, set the threshold as a second threshold calculated without considering the detection result of the temperature sensor, and in a case in which the detection timing belongs to a predetermined third section, set the threshold as the first threshold calculated in consideration of a detection result of the temperature sensor,
wherein the predetermined first section and the third predetermined sections are determined in advance in accordance with an installation position and an installation attitude of the transceiver as sections in which an expected value of clutter based on the reception wave obtained by a reflection from a non-detection target as the object that is not a target for detecting the information related to the object is equal to or less than a predetermined value,
the predetermined second section is determined in advance in accordance with the installation position and the installation attitude of the transceiver as a section in which the expected value of the clutter is larger than the predetermined value, and
the second section is between the first section and the third section with respect to the detection timing.

2. The object detection device according to claim 1, wherein
the transmission of the transmission wave by the transmitter and the reception of the reception wave by the receiver are performed by using a same transceiver fixedly installed at a predetermined position and a predetermined attitude, and
the predetermined first section and the predetermined second section are determined in advance in accordance with an installation position and an installation attitude of the transceiver.

3. The object detection device according to claim 1, wherein
the predetermined value corresponds to stationary noise which is stationarily generated in the transceiver.

4. The object detection device according to claim 1, wherein
the CFAR processor is configured to acquire the CFAR signal by any one of first CFAR processing based on a difference between the value of the first processing target signal and the average value of the values of the second processing target signals, second CFAR processing based on a ratio between the value of the first processing target signal and the average value of the values of the second processing target signals, and third CFAR processing based on normalization of the difference between the value of the first processing target signal and the average value of the values of the second processing target signals.

5. The object detection device according to claim 1, wherein
the detection processor is configured to detect a distance to the object as information related to the object.

* * * * *